United States Patent
Kumagai et al.

(10) Patent No.: US 8,057,237 B2
(45) Date of Patent: Nov. 15, 2011

(54) SYSTEM FOR EVALUATING SKILLS OF TO-BE-EXAMINED PERSON

(75) Inventors: Takasi Kumagai, Tokyo (JP); Hideki Kumagai, Tokyo (JP)

(73) Assignee: Shinko Engineering Research Corp., Tokyo (JP)

( * ) Notice: Subject to any disclaimer, the term of this patent is extended or adjusted under 35 U.S.C. 154(b) by 194 days.

(21) Appl. No.: 11/227,709

(22) Filed: Sep. 14, 2005

(65) Prior Publication Data

US 2006/0085224 A1  Apr. 20, 2006

(30) Foreign Application Priority Data

Oct. 1, 2004  (JP) ................................. 2004-289627

(51) Int. Cl.
G09B 25/00 (2006.01)

(52) U.S. Cl. ........ 434/379; 434/219; 434/224; 434/322; 434/323; 700/95; 700/97

(58) Field of Classification Search .................. 434/219, 434/234, 322, 224, 323, 379; 700/97, 95
See application file for complete search history.

(56) References Cited

U.S. PATENT DOCUMENTS

| | | | | |
|---|---|---|---|---|
| 4,091,550 A | * | 5/1978 | Schrenk et al. | 434/366 |
| 4,812,125 A | * | 3/1989 | Strashun | 434/224 |
| 5,262,954 A | * | 11/1993 | Fujino et al. | 700/112 |
| 5,717,598 A | * | 2/1998 | Miyakawa et al. | 700/103 |
| 5,860,810 A | * | 1/1999 | Faul | 434/219 |
| 6,120,298 A | * | 9/2000 | Jenkins et al. | 434/236 |
| 6,559,867 B1 | * | 5/2003 | Kotick et al. | 715/771 |
| 6,778,870 B1 | * | 8/2004 | Li et al. | 700/97 |
| 2002/0112733 A1 | * | 8/2002 | Miyauchi et al. | 128/925 |
| 2003/0132968 A1 | * | 7/2003 | Stewart et al. | 345/771 |
| 2003/0134262 A1 | * | 7/2003 | Fujita | 434/362 |
| 2003/0138759 A1 | * | 7/2003 | Rowley et al. | 434/219 |
| 2003/0163219 A1 | * | 8/2003 | Flesher | 700/185 |
| 2004/0029092 A1 | * | 2/2004 | Orr et al. | 434/354 |
| 2004/0091846 A1 | * | 5/2004 | Aughenbaugh et al. | 434/350 |
| 2004/0103380 A1 | * | 5/2004 | Bohl et al. | 716/4 |
| 2004/0123206 A1 | * | 6/2004 | Rohrbaugh et al. | 714/741 |
| 2004/0128120 A1 | * | 7/2004 | Coburn et al. | 703/26 |
| 2004/0167796 A1 | * | 8/2004 | Lynch et al. | 705/1 |
| 2004/0210466 A1 | * | 10/2004 | Hasebe et al. | 705/7 |
| 2004/0248071 A1 | * | 12/2004 | Bedziouk et al. | 434/247 |
| 2005/0033619 A1 | * | 2/2005 | Barnes et al. | 705/7 |
| 2005/0049912 A1 | * | 3/2005 | Troyer et al. | 705/11 |
| 2005/0050478 A1 | * | 3/2005 | Beierwaltes et al. | 715/968 |

(Continued)

FOREIGN PATENT DOCUMENTS

| | | |
|---|---|---|
| JP | 2002-024451 | 1/2002 |
| JP | 2002-132839 | 5/2002 |
| JP | 2004-110333 | 4/2004 |

*Primary Examiner* — Xuan Thai
*Assistant Examiner* — Bruk Gerbremichael
(74) *Attorney, Agent, or Firm* — Jordan and Hamburg LLP

(57) ABSTRACT

According to a question displayed on a computer screen, a to-be-examined person selects, out of constituent elements (components) displayed on the screen, constituent elements that he considers optimum for the question and then makes a design by constructing them on the screen, and the content of the design on the screen is evaluated by using predetermined evaluation data. Further, there is provided a system which enables assembling an actual apparatus (an apparatus to be evaluated) according to the content of design, measures the performance of the assembled actual apparatus and evaluates the ability of the to-be-examined person to assemble the actual apparatus from the measured data by using a computer.

5 Claims, 8 Drawing Sheets

U.S. PATENT DOCUMENTS

2005/0065842 A1* 3/2005 Summers .................. 705/11
2005/0079476 A1* 4/2005 Sutherland et al. ........... 434/323
2005/0080504 A1* 4/2005 Kataoka et al. ............... 700/105
2005/0095572 A1* 5/2005 Comer et al. ................. 434/362
2005/0240561 A1* 10/2005 Jain et al. ......................... 707/1
2005/0283740 A1* 12/2005 Cleeves et al. ................ 715/835

* cited by examiner

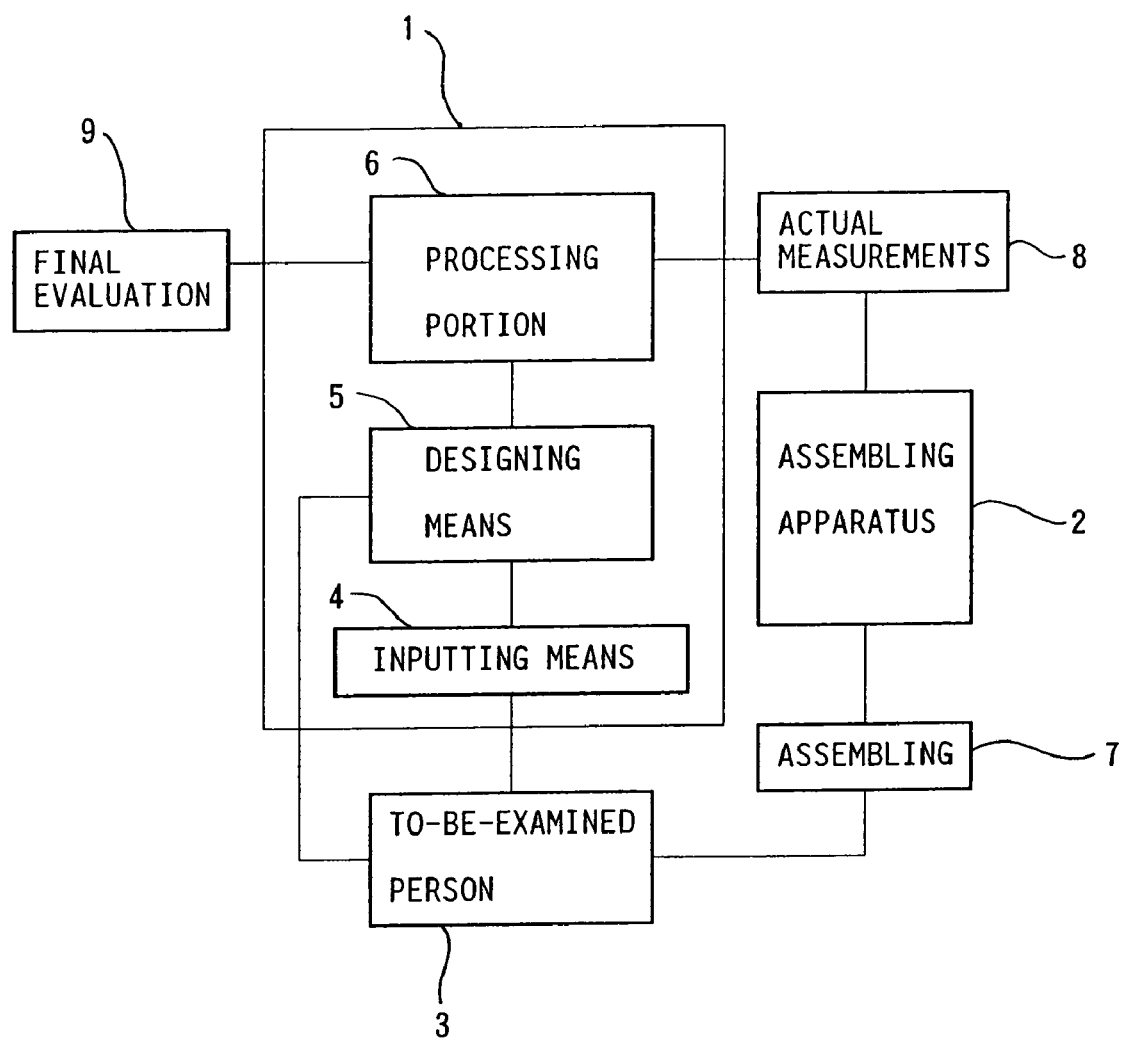
F I G. 1

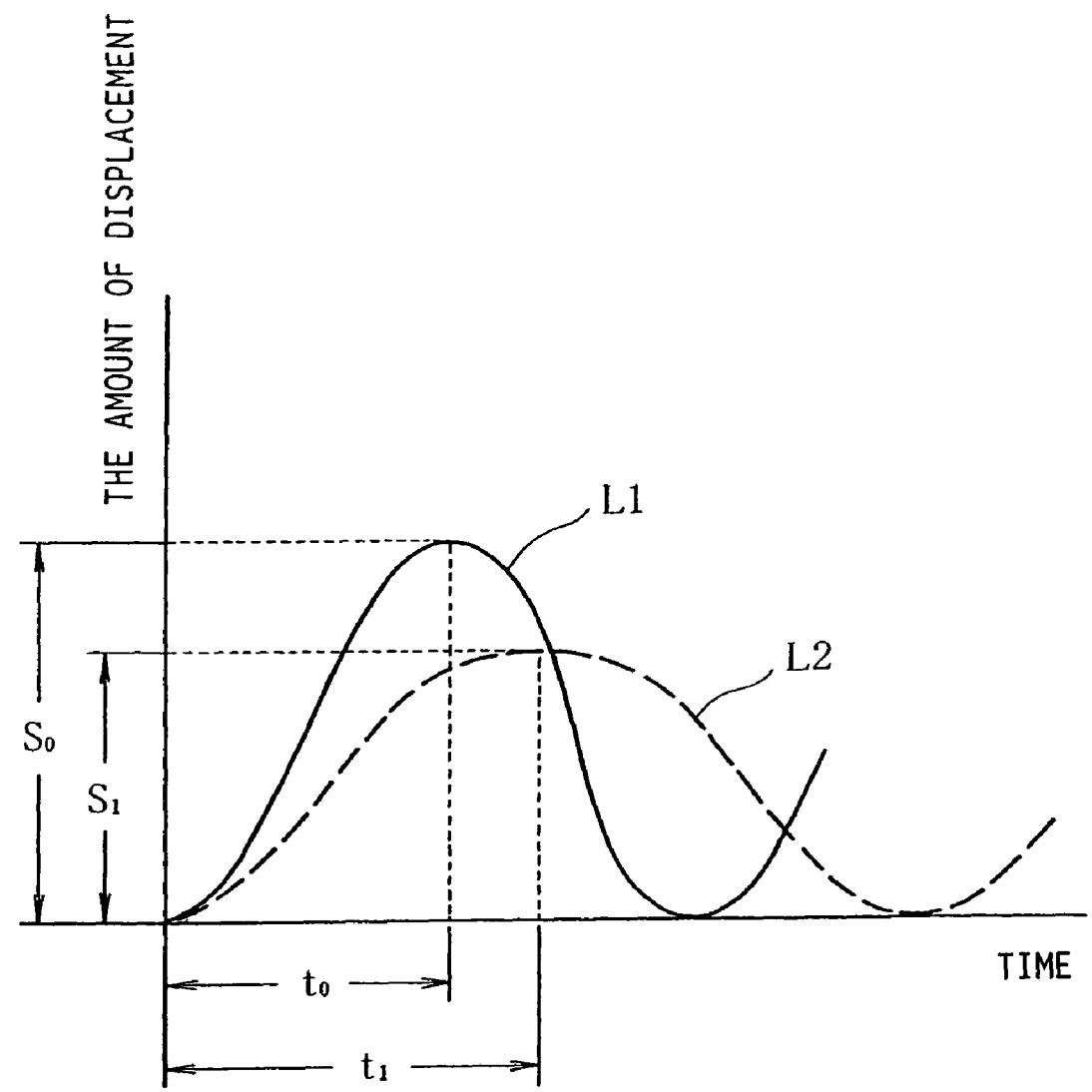
F I G. 5

| FIXED-TYPE AIR CYLINDER |
|---|
| CLEVIS TYPE AIR CYLINDER |
| AIR ROTARY ACTUATOR |
| REVERSIBLE INDUCTION MOTOR |
| SPEED CONTROLLED INDUCTION MOTOR |
| STEPPING MOTOR |
| SERVO NOTOR |
| STEPPING MOTOR DRIVING UNIT |
| SERVO MOTOR DRIVING UNIT |
| PNEUMATIC-HYDRAULIC CONVERTER CYLINDER |
| HYDRAULIC CYLINDER |
| REDUCTION GEAR UNIT   1/4   1/6   1/8   1/10   1/15 |
| REDUCTION GEAR UNIT  1/20   1/30   1/48   1/60   1/90 |
| FEED SCREW LEAD   5mm   10mm |
| RACK & PINION   PINION    TEETH 24 36 48 |
| CONECTION GEAR MECHANISM    TEETH 20 30 40 50 60 |
| CONECTION GEAR MECHANISM    TEETH 24 36 48 60 72 |
| WORM GEAR UNIT   1/10   1/20   1/30   1/60 |

FIG. 7

SYSTEM FOR EVALUATING SKILLS OF TO-BE-EXAMINED PERSON

BACKGROUND OF THE INVENTION

1. Field of the Invention

The present invention relates to a system for evaluating the technical ability of a to-be-examined person and more particularly relates to a system for determining and evaluating the abilities of a to-be-examined person to design a technical system and to construct an actual apparatus using a computer.

2. Description of the Prior Art

Recently, in various technical fields, private and public organizations have sponsored ability examinations and have given certain recognitions to people who have the abilities and, for example, they have given certain qualifications to people who passed the examinations. In this case, persons who have certain qualifications such as the qualification of Information Processing engineer have advantages in finding employment over persons having no qualification, and therefore it is deemed that this kind of ability examination systems will be increasingly conducted in more technical fields, in the future.

In reality, there is no system for objectively examining and evaluating the ability of a person who is involved in designing of, for example, an automatic manufacturing line for products or various types of automatic apparatuses for the lines and also in constructing automatic apparatuses having desired performance on the basis of the design (hereinafter, referred to as "an automation engineer") (the reason for this will be described later).

An automatic apparatus is temporally defined here as an apparatus which autonomously performs target operations on the basis of certain programs (software) and description of such an automatic apparatus will be given later when a concrete definition thereof is required.

The history of automation technologies can be classified into first to fourth generations, wherein the fourth generation is a generation which is expected to grow. Technical evaluations which form the substance of the present invention are based on the technologies of the respective generations and, therefore, the automation technologies of the respective generations will be described hereinafter.

Automation technologies can be conceptually represented as follows.

Referring to FIG. 4, in an automatic apparatus for causing an apparatus element (tool/designated by the character T) to perform desired operations for a certain object (work/designated by the character W) such as a mechanical member, for example, moving the work W that is the object to a predetermined position, there is provided a tool driving/controlling portion 50 consisting of a mechanism M (designated by the character M) for causing the tool T to perform predetermined operations, an actuator (designated by the character A) for providing a driving force to the mechanism M, a controller (designated by the character C) for controlling the operation of the actuator A and a sensor (designated by the character S) for providing predetermined information to the controller C through feedback control.

In the first generation, the mechanism M is configured to be of a non-uniform-conversion type (Mb) constituted by hinges and slides or the like. The actuator A for driving the mechanism M which is of the non-uniform-conversion type Mb is of a constant-velocity type Aa selected from motors which rotates at a constant speed or cylinders with piston rod which linearly moves. Accordingly, the controller C for controlling the actuator A which is of the constant-velocity type Aa is of an ON/OFF type Ca and the sensor S is of an ON/OFF type Sa capable of acquiring information about the operation of the mechanism M (indicated by the number 51) which is of the non-uniform-conversion type Mb.

Namely, in the first generation, the operation of the actuator A which performs simple constant-velocity operations Aa is converted into operations such as a velocity reduction at the stroke end through a crank mechanism, a rapid return through a lever-slider mechanism or a prevention of return through a toggle mechanism and the like to realize an ingenuity of the mechanism. The present inventors describe the first generation as "a generation of circles and straight lines" in many technical books and the like. Namely, the mechanism M, the actuator A, the controller C and the sensor S (hereinafter, referred to as "M•A•C•S") in the tool driving/controlling portion are configured as "(the non-uniform conversion type Mb)•(the constant-velocity type Aa)•(the ON/OFF type Ca)•(the ON/OFF type Sa). Namely, the M•A•C•S is configured as Mb•Aa•Ca•Sa.

The first-generation technology did not be discarded at the transition of the technology from the first generation to the second generation, and the first generation technology is still very usable now. The same is applied to the second generation and the subsequent generations which will be described later to increase the ingenuity of the apparatus. The configuration of the aforementioned mechanism Mb is a factor which significantly affects the ingenuity of the entire automatic apparatus of any of the generations including the first generation.

When the fabrication of cams was made easier with the development of machining tools, the second generation came. In the second generation, the ingenuity of the non-uniform conversion Mb of the mechanism M was improved by configuring the cam with high accuracy and complicacy. Although the M•A•C•S of the second generation is Mb•Aa•Ca•Sa similarly to the first generation, the non-uniform-conversion Mb realized by the cam used as the mechanism had significantly-improved ingenuity. Namely, it can be said that the second generation is "a generation of mechanical cams".

It is obvious that dedicated mechanical cams must be configured for respective operations of the tool T. However, with advancing manufacturing of a wide variety of products in small quantities due to variations of markets, it had become more difficult to cope therewith by the method of fabricating respective mechanical cams with the machining tools. Namely, it can be said that the third generation is "a generation in which the second-generation mechanical cam was changed to an information cam".

Namely, there was a need for a method which enables fabricating the cam with enhanced softness and the third generation realized that.

From a viewpoint of the functions of the second-generation cam, the cam had two functions which are "the function of transferring forces" and "the function of possessing information about position/time", thus enabling transferring the driving force of the actuator A through the mechanical cam to cause the tool T to perform predetermined operations.

On the contrary, the information cam is configured only to possess information while "the transfer of forces" is implemented through a servo.

Thus, an information cam configured only to possess information is realized in the following aspects.

(a) "template cam" like a cut-out paper pattern
(b) "picture cam" which is simply a drawn picture
(c) "software cam" stored in a memory of a computer Particularly, in the case of a software cam, when the product item is to be changed over, it is possible to achieve changeover of the cam (changeover of the cam curve) within an extremely short time by operating the computer through key-board inputting or through item-changeover signals from the outside, thus enabling largely enhancing the flexibility of the automatic apparatus.

Consequently, in the third generation, the mechanism M is mainly of a uniform-conversion type Ma, the actuator A is of a variable-velocity type Ab such as a servomotor, the controller C is of a numerical-quantity type Cb for controlling the actuator A of the variable-velocity type Ab, and the sensor S is of a measurement type Sb which outputs information of measurement values for ensuring the controlled operation with the controller C of the measurement type Cb, wherein the measurement information is, for example, the operation information 52 about the actuator A of the variable-velocity type Ab. Namely, the M•A•C•S is Ma•Ab•Cb•Sb.

As described above, the performance of automatic apparatuses has improved in terms of ingenuity and flexibility and the like, with the transitions from the first to the third generations. However, there were problems common to these three generations. That is, apparatuses of any of these generations can perform proper operations on the precondition that the condition of the to-be-operated work W and tool T is maintained constant (hereinafter, referred to as "work side consistency").

For example, when the work side consistency is maintained, such as when all of the to-be-operated works W have an identical shape and are placed at the same position, the aforementioned apparatuses of the respective generations can repeatedly perform ingenious operations at high speeds.

However, in the event of the occurrence of changes of the condition of the works W, such as deviation of the position at which the works W are placed, partial differences of the shapes of the individual works and stop of feeding of the works W to the tool T, namely in the event of impairment of the work side consistency, malfunctions will occur as follows. For example, the works W can not be properly handled with predetermined operations of the tool T, the works W can not be handled at all, or the predetermined operations are repeatedly performed even though there exists no work W. These problems may be caused by changes of the condition of the tool T such as wear of the tool T, as well as by changes of the works W.

Namely, the automatic apparatuses of the first to third generations are identical in the respect that they repeatedly perform the same operations for the same type of works. Even though the third-generation apparatus employing an information cam has significantly-improved flexibility in the respect that the cam can be rapidly changed, the respective cams are associated with the operations of the tool T with one-to-one relationship and also the third-generation apparatus operates relying on the work side consistency, similarly to the first and second generations.

In view of the aforementioned facts, the forth-generation apparatus forms a tool driving/controlling portion 50 configured to check the condition of the work W, detect the operating condition of the tool T which handles the work W and properly set and control the operation of the tool T in accordance with the condition of the work W and tool T.

Namely, as indicated by the numbers 53 and 54, the tool operating/controlling portion 50 is configured such that the sensor S directly acquires information about the work W and/or the tool T from the work W or the tool T and, on the basis of the information, the tool T is caused to perform proper operations in accordance with the conditions of the work W or the tool T. The forth-generation apparatus is configured by incorporating algorisms for determining the amount of movement of the tool T and/or the direction of driving of the tool T and the like in accordance with the condition of the work W or the tool T into the controller C of the tool driving/controlling portion 50 in order to enable ingenious control of the actuator A for properly controlling the operation of the tool T anytime.

Accordingly, the tool driving/controlling portion 50 is structured such that the mechanism M is of a uniform-conversion type Ma, the actuator A is of a variable-velocity type Ab such as a servo motor, the controller C is of a numerical-quantity type Cb, the sensor S is of a measurement type Sb, similarly to that of the third generation, wherein the setting for detection of the condition of the work W (the arrow 53) and/or the setting for detection of the condition of the tool T (the arrow 54) are utilized to make feedback signals and further the operation information 51 and 52 of the mechanism M and the actuator A is also utilized as required.

The automation technologies have been successively advanced from the first generation to the forth generation as described above. With advancing technologies, the number of automation engineers who deal with these technologies has been increased and such automation engineers have been required to have higher technical skills, year by year. Further, it is deemed that needs for automation engineers will be further increased in the future for realization of laborsaving, manufacturing of a wide variety of products in small quantities and consistency of products and the like in business organizations and the like. From this view point, business organizations which are employers eagerly desire to know the actual grades of skills of people referred to as automation engineers. However, at the present time, there is no system for evaluating the skills of automation engineers and for giving certain qualifications.

This is because of the following reasons.

For example, in the case of information processing engineers for whom there exist ability evaluation systems, the subjects of evaluations are substantially limited to software such as development and processing of software in essence. On the contrary, in the case of automatic apparatuses, the mechanisms constituting the apparatus and the software for operating the mechanisms are associated with each other in a complicated manner. Furthermore, there are various types of skills of automation engineers such as the ability to design an apparatus, the ability to construct an actual apparatus, the abilities for testing the performance of the constructed actual apparatus and to modify and repair it on the basis of the result of test. Therefore, there are a great number of determination factors for evaluating the skills of automation engineers, and the evaluations are complicated. Consequently, it will be necessary to process an enormous amount of information and thus the subjects of evaluations must be limited in advance in the case of manually conducting such evaluations. Further, since proper evaluations have been impossible at the present time for various reasons such as the difficulty of eliminating arbitrariness in evaluations, it has been considered that it is actually impossible to evaluate the skills of automation engineers objectively and fairly even though there has been strong needs therefore.

Next, in the case of mainly evaluating the automation-engineer's skills of constructing a mechanism or the like or mainly evaluating their skills about software for operating a mechanism, it is necessary to select and set questions suitable for such evaluations. Further, in the case of evaluating the ability of constructing an actual apparatus on the basis of the performance of the constructed actual apparatus, it is necessary to process and evaluate various types of items and, for example, it is necessary to process measured performance data about the actual apparatus. This will require an automated processing system employing a computer. However, there has not existed such a system at all prior to the present invention.

Namely, automation engineers are required to have various types of abilities as follows.

(1) the ability to select and design mechanisms constituted by selecting from a great number of combinations of hinges and slides (2) the ability to design mechanical cams for realizing various types of operation characteristics (3) the ability to design means for driving an electrical actuator such as an alternating-current motor, a direct-current motor, a solenoid and many others (4) the ability to design means for driving a fluid actuator such as an air cylinder, a rotary actuator and many others (5) the ability to design means for driving a pulse driven actuator such as a servo motor, a stepping motor and the like (6) the abilities to select various types of sensors such as photoelectric sensors, magnetic sensors and the like, select the portions for detections and select signal functions (7) the ability to program the setting of input and output of the control by a programmable sequence controller (8) the ability to set the input and output of control by a computer and to program therefor (9) the ability to set and design an input/output interface circuit along with the aforementioned (7) and (8)

The aforementioned items (1) to (9) are items which make respective specialized fields and, in actual, some of the items are treated as independent education subjects in universities and professional schools in technical fields.

The aforementioned items (1) to (9) are all means for attaining objects and automation engineers are required to have the abilities to select/set or design optimum items from the respective items and combine them. However, in practice, all engineers who have considerable knowledge do not have excellent ability to construct an overall system according to the object.

From the aforementioned viewpoints, it is likely that it is impossible to determine the actual ability to construct systems with the method of "determining the ability on the basis of means" which determines the technical abilities individually for the aforementioned respective means, since the method involves extremely a great number of determination factors, thus making the description of evaluations significantly complicated and also it is impossible to evaluate the ability to combine optimum selections for objects.

The present invention is characterized in that the evaluation is basically structured by "designation of target operation characteristics" for the to-be-examined person and "verification of the target attainment level" on the basis of the apparatus constricted by the person, in order to "determine on the basis of the target" and also in that, in order to attain the basic structure, significantly-complicated determination factors are all processed by a computer for making the determination of the overall technical ability of the to-be-examined person easy and accurately and also for enabling objective determinations.

Further, for the controller out of the constituent elements of the aforementioned automated apparatus, the following evaluation and determination have been locally conducted. That is, in the case of simple control using a programmable sequencer, a simple mechanism portion which operates with the sequencer is prepared and the technical ability to construct a program for driving the mechanism portion with the sequencer is evaluated and determined. As evidenced by the above description, this is far from the determination of the skill of an automation engineer. In other words, only limited skills can be evaluated with conventional methods which do not employ W. T. MACS overall automation evaluation systems with computers.

Although there has been found no prior-art technique similar to the present invention in terms of the technical field as previously described, the following Patent Documents are listed as literatures relating to the present invention. The following Patent Document 3 discloses a system in which designs are made using a computer and technical evaluations are conducted on the basis of the contents of the designs. However, this system merely determines and evaluates the content of designs made using the computer and does not have the viewpoint of constructing an actual apparatus or machine on the basis of the designs and evaluating the performance of the apparatus or machine for comprehensively evaluating the technical ability of the to-be-examined person. This is considered to be naturally resulted from the fact that Patent Document 3 aims at evaluating the ability to effectively utilize predetermined "designing software", namely the ability for the utilization of the software. Consequently, the "designing software" is different from "designing means" according to the present invention, which will be described later.

[Patent Document 1] JP-A No. 2002-024451
[Patent Document 2] JP-A No. 2002-132839
[Patent Document 3] JP-A No. 2004-110333

In automation techniques, it is most important to properly select elements from respective groups of, tools T which is moved in accordance with target operations for the work W, and mechanisms M, actuators A, controllers C and sensors S for realizing the movement of the tool T and also construct the apparatus with the elements, and the system for evaluating the skills of automation engineers is required to properly evaluate these points.

For these points, there are many items to be considered such as the velocity characteristics and force characteristics, the cycle time of movement, the amount of movement, the accuracies of movement and stoppage, the characteristics changes due to the changes of the load and the friction coefficient, the setting of interlock with respect to the operations of other mechanisms which cooperate therewith, the setting of overlap of the operation and the like. Proper evaluations must be conducted in terms of such items.

For setting relating to the aforementioned items, it is necessary to actually construct an apparatus using actual equipment, operate the apparatus and verify it for inspecting whether or not the accuracy of the actual apparatus matches the theoretical accuracy, as well as merely setting values on paper. Namely, there is a need for equipment for enabling construction of an actual apparatus for evaluating the skill (practical skill) of constructing an actual apparatus and a system for evaluating the performance of the actual apparatus constructed using the equipment. Also, it is necessary to incorporate such a practical-skill evaluation system into the skill evaluation system.

It is an object of the present invention to provide a skill evaluation system using a computer which is made for overcoming the aforementioned problems and includes at least means for determining the ability to design, out of determination means for determining the ability of a to-be-examined person to design, assembling equipment for assembling an actual apparatus according to the content of the design, means for measuring the performance of the assembled actual apparatus and means for determining the ability of the to-be-examined person to construct an actual apparatus from the measurement data acquired by the measuring means.

SUMMARY OF THE INVENTION

According to a question displayed on a computer screen, a to-be-examined person selects, out of constituent elements (components) displayed on the screen, constituent elements that he considers optimum for the question and then makes a design by constructing them on the screen, and the content of the design on the screen is evaluated by using predetermined evaluation data. Further, there is provided a system which enables assembling an actual apparatus (an apparatus to be evaluated) according to the content of design, measures the performance of the assembled actual apparatus and evaluates the ability of the to-be-examined person to assemble the actual apparatus from the measured data by using a computer.

BRIEF DESCRIPTION OF THE DRAWINGS

FIG. 1 is a block diagram illustrating the general outline of an apparatus for executing the system according to the present invention;

FIG. 5 is a diagram illustrating a target displacement characteristic for a question and a displacement characteristic of an apparatus constructed by a to-be-examined person;

FIG. 7 is a view representing an exemplary list of usable members displayed on a computer screen.

DESCRIPTION OF THE PREFERRED EMBODIMENTS

Figure 2:
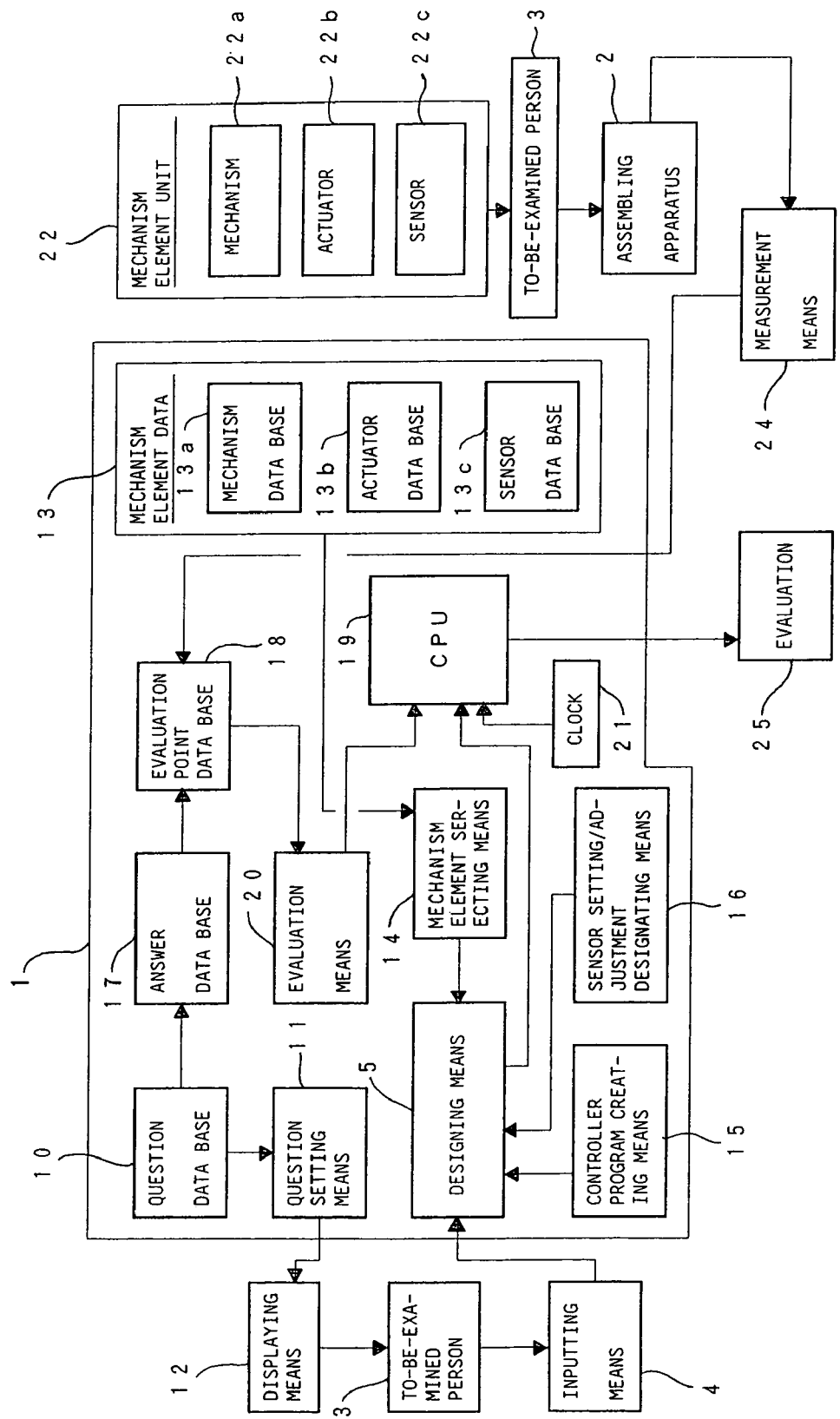
FIG. 2 is a block diagram illustrating, in detail, the functions of the computing portion 1, out of the blocks illustrated in FIG. 1.

Hereinafter, embodiments of the present invention will be described using the drawings.

FIG. 1 illustrates the general outline of the structure of an apparatus for realizing a system according to the present invention. This apparatus includes a computer as a computing portion 1 constituting the apparatus main body and an assembling apparatus 2 which enables assembling the content of design which is made by a to-be-examined person 3 at the computing portion 1.

First, the general outline of the flow of this system will be described with reference to FIG. 1. Here, FIG. 1 illustrates the structure of an apparatus for executing this system.

At first, a predetermined question is displayed for the to-be-examined person 3 on a display portion (designated by the reference character 12 in FIG. 2) such as a liquid crystal or a CRT of the computing portion 1 or through hard copying. Out of the usable elements for the aforementioned question such as the aforementioned mechanism M, the actuator A, the controller C, the sensor S, the interfaces, connecting members and the like, elements which can be displayed by graphics such as the mechanical module and the actuator are displayed on the display portion of the computing portion 1. More specifically, for example, types and lengths of the lever and the rod and lengths of the crank arm and the like are displayed for the mechanism M, and types of the actuator such as an air cylinder and a stepping motor and the like, and the amount of strokes of the air cylinder and the like are displayed for the actuator A by images, graphics, specific numerical values for those having specific numerical values or setable ranges for those having variable numerical values.

Out of these elements, the to-be-examined person 3 selects, at a designing means 5, constituent elements displayed for the aforementioned question through an inputting means 4 such as a key board or a mouse, selects elements that he considers optimum, associates the respective elements with one another and further inputs numerical values to perform designing (a concrete example of the designing method will be described later in more detail) When the designing has been completed, design content data (data indicating the content of the design made by the to-be-examined person 3) made by the to-be-examined person 3 is evaluated by a processing portion 6 and the computing portion 1 executes an evaluation about the ability of the to-be-examined person 3 to conduct designing at first.

Next, the to-be-examined person 3 selects actual constituent elements corresponding to the constituent elements employed in his design made at the designing means 5 and actually assembles a mechanism based on his design at the assembling apparatus 2 (the reference numeral 7). Subsequently, the assembled mechanism is actually operated and the operating condition, the operation accuracy and the like are determined (the reference numeral 8) and the determined data is automatically output to a processing portion 6 of the computing portion 1. The processing portion 6 evaluates the ability of the to-be-examined person 3 to assemble an actual apparatus on the basis of determination/evaluation data which has been made to be data in advance. Further, the processing portion 6 finally evaluates the skill of the to-be-examined person 3 from the evaluation data of the ability to design and the evaluation data of the ability to assemble the actual apparatus (the reference numeral 9).

At this time, there is also a method as follows. That is, the to-be-examined person 3 determines the performance of the actual apparatus designed by himself and, when the result of the determination reveals, for example, that the designed configuration can not provide a sufficient maximum speed, he modifies the design of the mechanism, assembles an actual apparatus again on the bases of the modified design and then performs determination until the target performance can be provided. In this case, the number of times the design has been modified to provide the target performance and the like is also employed as a criterion for the skill evaluation.

Figure 3:
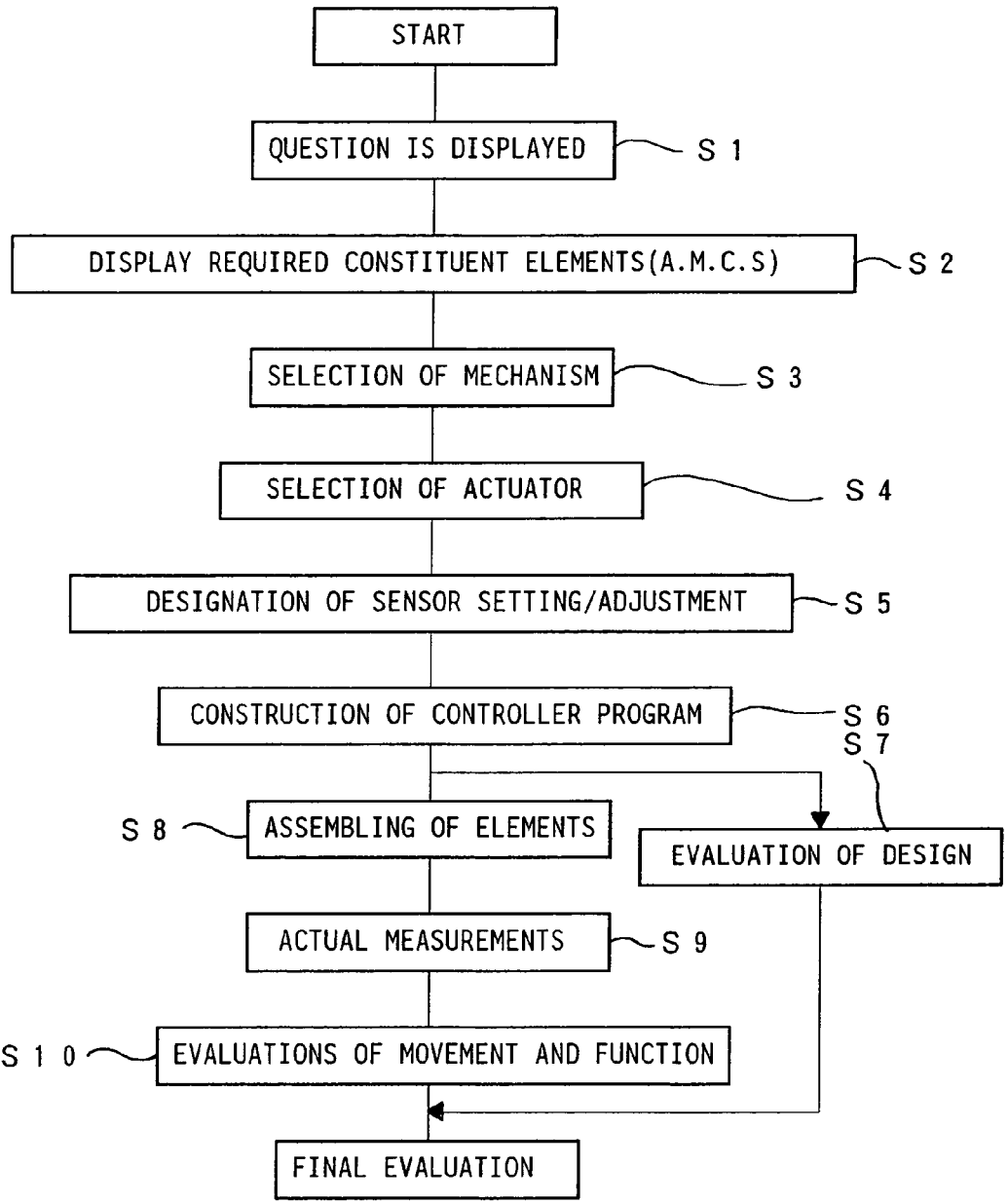
FIG. 3 is a flow diagram illustrating an exemplary executing condition of the system according to the present invention.
Figure 4:
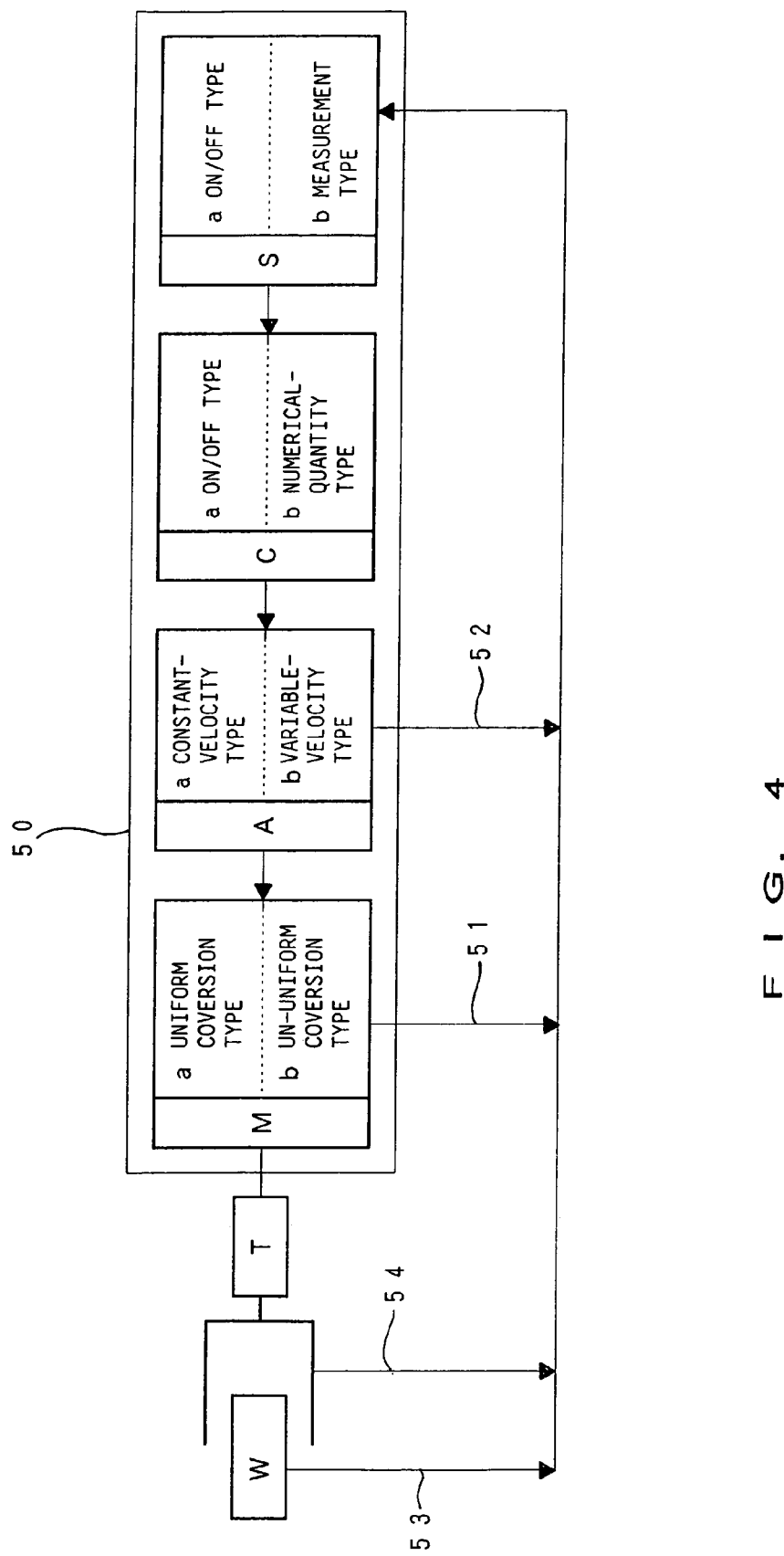
FIG. 4 is a block diagram conceptually illustrating the structure of the tool driving/controlling portion for controlling the movement of the tool.

With reference to FIG. 2 and FIG. 3, the aforementioned structure will be described in more detail. FIG. 2 illustrates the structure of the apparatus for executing this system and FIG. 3 illustrates an exemplary condition where this system is being executed.

In a question data base 10 of the computing portion 1, questions for determining and evaluating the skill (ability) of the to-be-examined person 3 has been preset and prerecorded. These questions include, as data, direct questions such as "Construct a system for . . . " and also include equipment for achieving the direct issues, operating conditions (accuracy) and the like.

A person who executes the skill evaluation of the to-be-examined person 3 selects a predetermined question through a question setting means 11 and the content of the selected question and the required constituent elements are displayed on a displaying means 12 (S1 and S2 of FIG. 3). The to-be-examined person 3 designs a mechanism for achieving the question displayed on the displaying means 12 and constructs an actual mechanism corresponding to the content of the design. In this case, the mechanism and the actuator and the like set for the question may be displayed, on the displaying means, either by text such as a "variably-structured mechanism module" or by graphics of elements constituting the module such as a flat cam, a lever, a slider and the like.

First, the to-be-examined person 3 constructs a mechanism for achieving the aforementioned question by the designing means 5 through the inputting means 4. At this time, in the case where the constituent elements of the mechanism are displayed by graphics on the displaying means, it is possible to make the design, for example, by dragging the respective constituent elements to predetermined positions on the displaying means 12 (this method will be described later in more detail using the drawings). Particularly, by configuring the system to graphically display the content of design from the beginning using as little language as possible, this system may be utilized all over the world without language barrier. Namely, the designing means used therein may have any structure which enables the to-be-examined person 3 to select predetermined elements for constructing a mechanism that he considers optimum for the given question enables him to set the combination of the selected elements and also enables conversion of the content of design into objective data for evaluation. Accordingly, the "designing means" does not designate software for designing with narrow sense.

The to-be-examined person 3 selects optimum elements from the group of mechanisms M, the group of actuators A and the group of sensors S (S3, S4 and S5) which are displayed through the designing means 5. Further, in order to enable feedback control of the entire mechanism, he sets the ability of the sensor S selected for detection during the designing, through means 16 for setting and adjusting sensors. The aforementioned selection is performed as follows. That is, the to-be-examined person 3 selects elements from a mechanism data base 13a, an actuator database 13b and a sensor database 13c within a mechanism element data 13 through mechanism-element selecting means 14 and performs designing through the designing means 5 in accordance with, for example, the aforementioned method. In this case, the mechanism element data 13 is preset such that only mechanism elements corresponding to the set question can are prepared in aforementioned mechanism element data 13. However, it is also possible to set the mechanism element data 13 such that all constituent elements including other constituent elements than those corresponding to the question, instead of pre-limiting the selection range, to enable evaluating the ability of the to-be-examined person 3 to design under more strict conditions.

Further, in addition to these mechanism elements, the to-be-examined person 3 creates a predetermined controller program through means 15 for creating a controller program for controlling the constructed mechanism. (S6).

With the aforementioned method, the to-be-examined person 3 performs designing for the predetermined question and the evaluation system grades and evaluates the content of design (S7). Namely, answers have been input to an answer data base 17 for respective questions stored in the question data base 10 and evaluation points are stored in an evaluation-point data base 18 in association with degrees of achievement of the questions.

A central processing device 19 evaluates the ability of the to-be-examined person 3 for designing from the point calculated at an evaluating means 20 on the basis of the design data made by the to-be-examined person 3 and the time taken to complete the design which is output from a clock 21. The processes for the evaluation of the ability of designing are all performed at the computing portion 1 which is a computer.

Then, when the to-be-examined person 3 has completed the designing, he actually constructs the mechanism on the basis of his design (S8). At this time, he selects the mechanism elements used in his design from a mechanism unit 22a, an actuator unit 22b and a sensor unit 22c through a mechanism element unit 22, then assembles an actual apparatus as shown on the assembling apparatus 2 and performs setting of the aforementioned controller.

On completing the construction of the actual apparatus, the to-be-examined person 3 terminates the operation and the time taken to complete the operation is output to the central processing device 19. Further, the data of operation of the actual apparatus (data of the accuracy, operation speed and the like) which has been determined by the determining means 24 is output to the evaluation-point data base 18 and the ability of constructing an actual apparatus is graded and evaluated through the evaluating means 20 in accordance with the same method as that for the ability of designing (S 9 and S10). Further, similarly to the case of the ability of designing, the clock 21 outputs the time required to complete the construction of the actual apparatus and the result of time measurement therefrom is also added to the evaluation of the ability of constructing an actual apparatus.

Finally, the central processing device 19 determines and evaluates the ability of the to-be-examined person 3 for automatic equipment, from the evaluations for the ability of designing and the ability of constructing the actual apparatus (the reference numeral 25 in FIG. 2).

Exemplary criteria for evaluation will be described as follows.

Namely, if there are differences between operation characteristics of the constructed actual apparatus and the target characteristics (question), the point of the to-be-examined person 3 will be detracted in accordance with the differences. Also, if the time taken to complete the construction of the actual apparatus is long, this may be utilized as an object of detraction of the point. This time is counted by the clock 21 of FIG. 21, for example.

For the evaluation and the determination of operation characteristics, for example, a frictional driving roller type potentiometer constituted by a friction disk mounted to the shaft of a potentiometer can be pressed against the output end such as a slide table (linearly moving table) surface to detect the output operation characteristics, thus providing a graph of the displacement operation characteristic as in FIG. 5.

In the figure, L1 is a curve illustrating a target displacement characteristic and L2 is a curve illustrating an actual displacement generated by the operation of the apparatus constructed by the to-be-examined person 3. Obviously, as the curve L2 approaches the curve L1, the to-be-examined person 3 will get a higher point. Here, $S_0$ indicates a maximum target displacement and $t_0$ indicates the time taken to move $S_0$. On the other hand, $S_1$ indicates a maximum displacement provided by the apparatus constructed by the to-be-examined person 3 and $t_1$ indicates the time required to move $S_1$.

In view of the aforementioned curves L1 and L2, comparisons are made between the data at respective points on the diagrams L1 and the data at the respective points of the curve L2 and the following grading method is applied thereto. For example, if the maximum value S1 of the operation of the apparatus constructed by the to-be-examined person 3 is different from the maximum value $S_0$ of the target curve L1 by 10% thereof, 10 points will be detracted from a maximum point of 40 point and, if the average speed V1 of the apparatus is different from the target average speed $V_0$ by minus 10% thereof, 5 points will be detracted from the aforementioned maximum points.

Here, the target average speed $V_0$ and the average speed $V_1$ provided by the apparatus of the to-be-examined person 3 are defined as the following equations.

$$V_0 = S_0/t_0$$

$$V_1 = S_1/t_1$$

Further, there is another evaluating method as follows.

The procedure until the to-be-examined person 3 completes assembling of an actual apparatus is the same as that of the aforementioned example and, after detecting operation characteristics thereof, the structure and the design of the system are modified as previously described as required. Namely, the design and the structure of the actual apparatus are repeatedly modified and, when the target operation characteristics can be finally achieved, point detraction is performed on the basis of the time taken until then, the number of design-modified components and the number of modified program steps and the like. In this case, the desired characteristics can be finally realized, thereby providing the advantage that determination criteria can be established more easily than the degrading method employing operating characteristics comparisons. Namely, this evaluating means provides the advantage that the evaluation-point data base 18 of FIG. 2 can be structured more easily.

Further, it is necessary to incorporate many types of elements into the computing portion 1 of the four groups of elements for constructing automatic systems which are the group of mechanisms M, the group of actuators A, the group of controllers C and the group of sensors S and actually prepare the mechanism-element unit 22 such that these elements can be used for assembling respective mechanisms associated with various data to enable the to-be-examined person 3 to set and combine them over a wide range during constructing the mechanism by selecting constituent elements from a number of elements.

More specifically, it is desirable that the respective elements are prepared to have structures and functions such that means having the following functions can be structured.

[1] Mechanisms
   (a) Velocity up/down means with the mechanism
   (b) End-velocity reduction means with the mechanism
   (c) Driving-direction changing means with the mechanism
   (d) Partial-velocity changing means with the mechanism
   (e) Force increasing/reducing means with the mechanism
   (f) Amount of motion changing means with the mechanism, etc.

[2] Actuators
   (a) Electric power actuator
   (b) Air-pressure power actuator
   (c) Fluid-pressure power actuator
   (d) Heat power actuator There are provided the following outputting means for the respective actuators (a) to (d).
   (e) Rotation output
   (f) linear-movement output
   (g) Swing output, etc.

[3] Controllers
   (a) Electrical controller
   (b) Electronic controller
   (c) Fluidal controller
   (d) Thermal controller, etc.

The aforementioned respective controllers are prepared as programmable controllers or connection-variable controllers such as replacing pins which enable arbitrarily constructing the circuits thereof.

[4] Sensors
   (a) Electrical sensor
   (b) Electronic sensor
   (c) Magnetic sensor
   (d) Thermal sensor
   (e) Optical sensor, etc.

For the aforementioned respective sensors (a) to (e), there are prepared sensors or auxiliary tools which enable to select the following outputs.
   (f) On/off type output
   (g) Measurement type output Hereinafter, there will be described exemplary questions and exemplary point allocations on the precondition that the aforementioned elements are prepared.

[Question 1]

"Construct a system for realizing a constant-velocity reciprocating movement under the following conditions."

(The Content of Movements)
   a. The amount of stroke from a starting point to a target point; 80 mm
   b. The stoppage-position accuracy at the target point; +−0.5 mm or less
   c. The stoppage-position accuracy at the starting point; +−0.5 mm or less
   d. Motion velocity characteristics; a constant velocity in the both directions
   e. The time required for moving from the starting point to the target point; 2 seconds+−0.5 second or less
   f. The restoring time from the target point; 2 seconds+−0.5 second or less
   g. The outputting mechanism; a linearly-moving table
   h. The load; only the weight of the table
   i. The content of operations
     (ia) A starting switch is used to start operations.
     (ib) stoppage for 1 second at the target point, automatic restore
     (ic) An end signal is output just after the automatic restore.

(Usable Members: These Must be Selected from the Following Respective Groups)
   a. Mechanisms; the group of variably-structured mechanism modules and the group of velocity-reduction units
   b. Actuators; the group of electrically-driven actuators
   c. Controllers; programmable sequence controllers
   d. Interfaces; interface modules
   e. Sensors; magnetic proximity sensors
   f. Others; clamping mechanisms, connection cables, etc.

(A) The Evaluation System for the Aforementioned Question 1 [Potentiometer-Type Movement Characteristics Detection System]

Required members
   (a) Potentiometer
   (b) Interface unit
   (c) Personal computer and dedicated software (B) The Content of Evaluations
   (a) The selection of the mechanism; 20 points
   (b) The selection of the actuator; 10 points
   (c) The construction of the controller programs; 20 points
   (d) The setting and adjustment of the sensor; 10 points
   (e) The output movement characteristics; 20 points
   (f) The time taken for designing and constructing; 20 points
   Total points; 100 points The aforementioned respective data is automatically processed by the computing portion 1 to evaluate the skill of the to-be-examined person 3.

Figure 6:
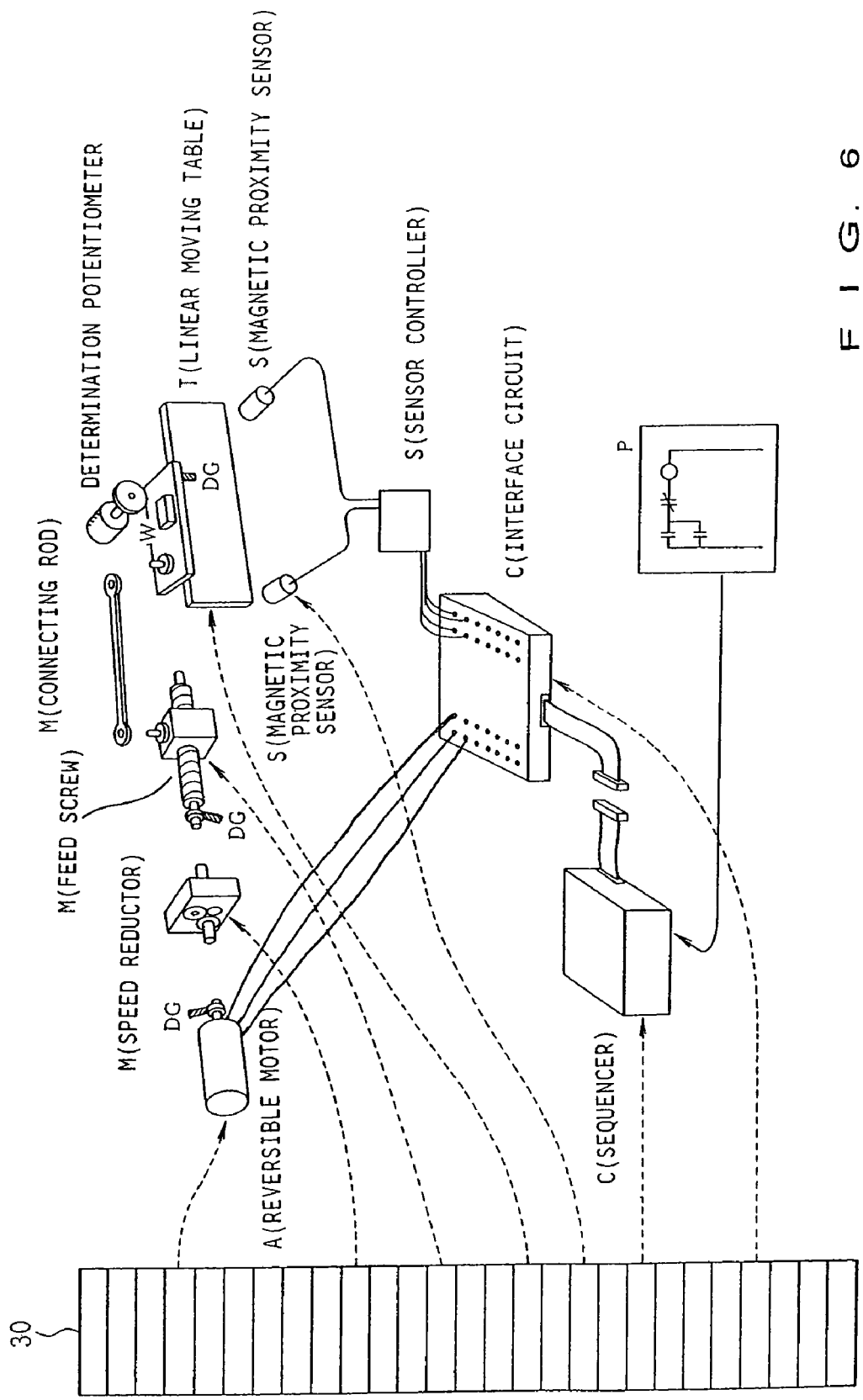
FIG. 6 is a view representing an exemplary design content displayed on a computer screen.

FIG. 6 is an exemplary designing method which is executed on the screen of the computer.

The reference numeral 30 designates a list representing usable members on the computer screen and they are represented as in FIG. 7, for example.

The to-be-examined person 3 selects members that he considers necessary for the aforementioned question. At this time, the to-be-examined person 3 moves the mouse to the members represented in the list 30, drags the selected members from predetermined fields of the list 30 to display displayable graphics (icons) corresponding to the members, then drags the icons to predetermined positions on the display screen and drops the icons thereat. By repeatedly performing this operation, the to-be-examined person 3 designs an apparatus for the question on the computer screen.

FIG. 6 illustrates a condition where icons are used for designing. A, M, C and S in the figure correspond to the mechanism M, the actuator A, the controller C and the sensor S which have been previously described. Further, there are designated characters such as A (reversible motor), M (connecting rod) . . . , near the respective icons and they indicate the contents of the icons illustrated in FIG. 6 for convenience of description. Accordingly, such characters are not always displayed on the actual screen for designing. However, there is no harm in displaying such characters on the screen in view of the convenience to the to-be-examined person 3. Further, the reference character DG in the figure indicates dogs for sensor setting and P indicates a program created by the to-be-examined person 3. Further, the dot lines indicate dragging paths for the convenience of explanation/description and such paths are not displayed on the actual screen.

Next, there will be described an exemplary question at a higher level than the aforementioned question 1.

[Question 2]

"Construct a system for realizing an end velocity-reduction reciprocating movement under the following conditions."

(The Content of Movements)

a. The amount of stroke from a starting point to a target point; 100 mm b. The stoppage-position accuracy at the target point; +−0.5 mm or less c. The stoppage-position accuracy at the starting point; +−0.5 mm or less d. Movement velocity characteristics; an end-velocity reduction in the both directions e. The time taken for moving from the starting point to the target point; 1 second+−0.2 second or less f. The restoring time from the target point; 1 second+−0.2 second or less g. The outputting mechanism; a linearly-moving table h. The load; the weight of the table plus loading weights (each weights 750 g)

i. The content of operations (ia) A starting switch is used to start operations.

(ib) Pause at the target point, an intermediate stoppage signal is output.

(ic) Automatic restore in response to a restoring command signal or after the elapse of 3. 5 seconds.

(id) Finishes the operation if stopping input is received between the intermediate stoppage to the end of restoring motion.

(ie) An end signal is output just after the automatic restore.

(if) Automatic restart after the elapse of 4 seconds in the case of absence of a stopping input (Usable Members: These Must be Selected from the Following Respective Groups)

a. Mechanism; variably-structured mechanism modules and velocity-reduction units b. Actuator; air-pressure actuators e. Controller; programmable sequence controllers d. Interface; interface modules e. Sensor; sensors such as transmission-type photoelectric switches, proximity switches, limit switches f. Others; clamping mechanisms, connection cables, etc.

(A) The Evaluation System for the Aforementioned Question 2 [Potentiometer-Type Movement Characteristics Detection System]

Figure 8:
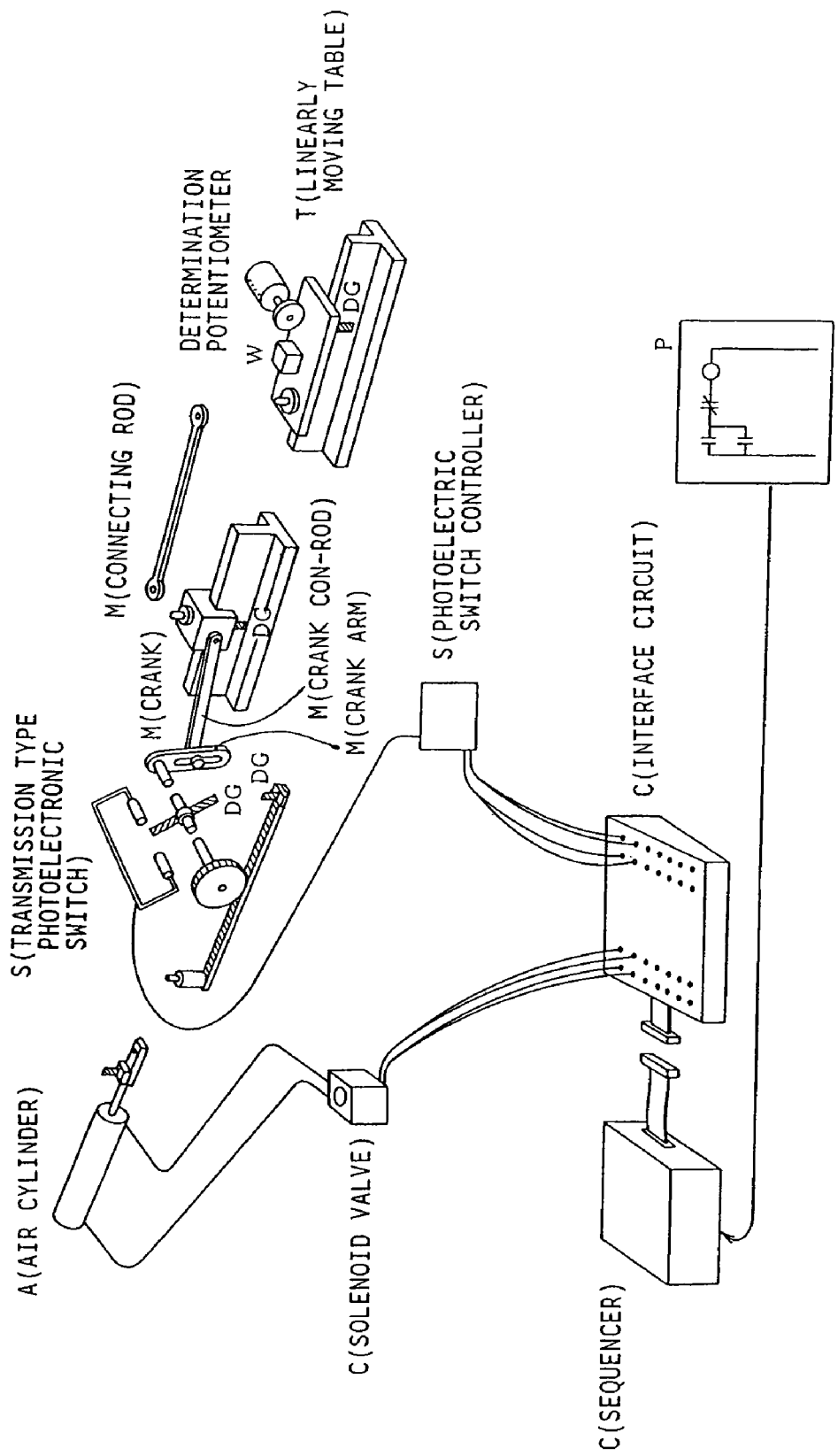
FIG. 8 is a view representing a state where a design content for another question is displayed on the computer screen.

Required members (a) Potentiometer (b) Interface unit (c) Personal computer and dedicated software (B) The Content of Evaluations (a) The selection of the mechanism; 40 points (b) The selection of the actuator; 20 points (c) The construction of controller programs; 30 points (d) The setting and adjustment of the sensor; 30 points (e) The output movement characteristics; 40 points (f) The time required for designing and constructing; 40 points Total points; 200 points FIG. 8 illustrates the content of design made by the to-be examined person 3 for the aforementioned question, wherein there is illustrated a condition where icons are placed on the computer screen similarly to in FIG. 7. Further, in the same figure, an illustration of the dragging paths and the list are omitted.

While exemplary questions have been exemplified hereinbefore, the basic evaluation criterion for the evaluation of an automation engineer is as to which of the first to fourth generation automation technologies his ability of constructing can realize and therefore it is desirable that the evaluation-point data stored in the evaluation-point data base 18 in FIG. 2 is constructed in view of this point.

While in the aforementioned examples there have been described systems for evaluating the skill of a to-be-examined person in the field of automation technology, the system according to the present invention is not limited thereto and is applicable to evaluations in other fields by properly setting question data, answer data of the to-be-examined person for the question data and evaluation data for practical skills such as the skill for constructing an actual apparatus.

Further, while in the aforementioned examples there have been described cases of executing the system in a single computer, the system may configured such that a host computer may be data-linked to plural terminal computers, the terminals may be provided with designing means, questions may be output from the host computer to the terminals, the to-be-examined persons make a design corresponding to the question using the designing means in the respective terminals and the design data may be output to the host computer for evaluating the ability of designing. This enables easily performs ability examinations for the ability of designing on a national basis. Further, when examinations are conducted on a national basis as described above, it is possible to rationally conduct evaluations of ability for constructing an actual apparatus by gathering to-be-examined persons at a predetermined hall, performing actual-apparatus assembling tests and performance tests and the like and outputting the operation data to the aforementioned host computer.

Since according to the present invention, the to-be-examined person creates design data and inputs it to a computing apparatus as an answer for the given question and the design data is directly evaluated by the computing apparatus as skill-evaluation data for the to-be-examined person, it is possible to process large evaluation data within a short time without requiring many hands and also it is possible to conduct skill evaluations fairly within a short time.

Further, in addition to designing using the computing apparatus, the to-be-examined person constructs an actual apparatus on the basis of the design data, and the performance of the actual apparatus is evaluated to simply evaluate the ability of designing and also the ability of constructing and setting an actual apparatus, which enables evaluations of the skill of the to-be-examined person with higher accuracy and validity. Also, instead of the to-be-examined person, a person who conducts the evaluation or a neutral third person may construct an actual apparatus in accordance with the design made by the to-be-examined person and may designate and record the differences between the characteristics thereof and the target characteristics.

Further, by graphically displaying the placement and combination of respective constituent elements selected by the to-be examined person on a computer device and by converting the content of design made by the to-be-examined person into data using as little language as possible, it is possible to improve the usability of the evaluating system in countries around the world where different languages are used.

The invention claimed is:

1. An evaluation system employing a computing device for evaluating the skill of a subject in the design and assembly of automated mechanisms wherein, in response to a design and assembly task having associated target design and operation characteristics that is displayed to the subject by a display means, the subject designs and assembles an actual automated mechanism having operation characteristics and the system evaluates, by actual measurement, the actual operation characteristics of the assembled automated mechanism, the system comprising:

a computing portion having a processing portion for at least receiving data that includes input data from the subject and operating condition data, and further for determining a final evaluation of the subject comprising adjusting a point value associated with the performed design and operability thereof to provide a point score indicating a quality of the performed design and operability thereof relative to the target design and operability thereof in which said adjustment comprises deduction of a point value from said point value associated with said target design and operability thereof, said deducted point value comprising a point value respectively associated with selection of components used to construct said object by said subject, operability of said object constructed with said components, time of completion of said performed design, and an amount of modification of said performed design relative to said target design and operability, said amount of modification being defined by the number of times said performed design has been modified by the subject in order to achieve said target design and operability;

a plurality of inputting and outputting means for at least graphical or alpha-numeric communication with the subject, via a display means that is a graphical interface cooperating with a computer mouse or a keyboard, and communication with an external measurement means, the computing portion further comprising:

a design means in communication with the subject, the processing portion, and means for selecting a design and assembly task;

a plurality of permanently stored databases at least one of which stores selectable design and assembly tasks and target operation characteristics therefor;

a database for receiving and storing measured operation condition data, the system further comprising:

an apparatus assembly portion for assembly by the subject of an actual automated mechanism which mechanism consists essentially of one or more non-uniform-conversion-type mechanisms, an actuator for each of the one or more non-uniform-conversion-type mechanisms for driving the one or more non-uniform-conversion-type mechanisms, a controller for controlling the actuator or actuators, one or more sensors for sensing the speed, position, or orientation, or a combination of these, of the non-uniform-conversion-type mechanisms, and connecting members; and an actual automated mechanism measurement portion for measuring operation characteristics of the assembled automated mechanism and comprising a means for outputting the results of the measurements to the processing portion of the computing portion, and a timing means, wherein, in operation of the system, design and assembly task having target operation characteristics and an assortment of elements useable for design and assembly of an automated mechanism capable of accomplishing the task and selected from the group consisting of non-uniform-conversion-type mechanisms, actuators, controllers, sensors, and connectors are graphically or alpha-numerically displayed to the subject via the display, whereupon the subject communicates to the designing means, via an input means, a selection and juxtaposition of elements and controller programming information, whereupon the elements selected by the subject are provided at an assembly apparatus where the actual automated mechanism is manually constructed by the subject, whereafter the operation characteristics of the actual constructed automated mechanism are measured by the actual automated mechanism measurement portion and communicated to the processing portion; and wherein at the assembly portion where the subject constructs, programs automation if a programmable controller is selected, tests the actual automated mechanism as constructed and programmed, and performs post-modifications, programming, and testing of the actual automated mechanism designed by the subject, the subject performing without assistance of another and without availability of step by step instructions designed by another, whereby the technical ability being demonstrated by the design, construction, programming, testing, and modifications, and that which is to be evaluated, is that only of the subject.

2. A method of evaluating the skill of a subject in the design and assembly of automated mechanisms comprising the steps of:

a) providing an evaluation system comprising a computing device adapted to evaluate the skill of the subject to design and assemble an automated mechanism, wherein the adapted computing device comprises a computing portion having at least a processing portion, a designing means, and an inputting means that is selected form an alphanumeric interface, a computer display, a computer display that is a graphical interface, or a combination of any of them, the inputting means in communication with at least the designing means, a timing means for measuring an evaluation time in communication with the processing portion, and a plurality of data bases within the processing portion;

b) initiating the timing means and displaying on the computer display a question that is an evaluation task for designing and assembling an automated mechanism having prerecorded target design and operating characteristics stored in a database in the processing portion, and graphically or alphanumerically presenting to the subject an assortment of possible constituent elements for construction of an actual automated mechanism which mechanism consists essentially of mechanisms, actuators, programmable or nonprogrammable controllers, sensors, and connecting members;

c) communicating to the processing portion, via the inputting means, a selection and juxtaposition of constituent elements as selected and juxtaposed by the subject and, if a programmable controller is selected, programming information for such selected programmable controller selected by the subject;

d) comparing, in the processing portion, the selection and juxtaposition of constituent elements selected by the subject against a list of constituent elements and their juxtaposition corresponding to the displayed evaluation task and stored in an answer database to determine a design deviation therebetween;

e) providing to the subject actual exemplars of the selected constituent members at an assembling apparatus, whereupon the subject manually constructs at the assembling apparatus an actual automated mechanism consisting of the provided constituent members juxtaposed as communicated in step c);

f) stopping the timing means to fix an evaluation time that is the time elapsed between steps b) and completion of construction in step e) and communicating the evaluation time to the processing portion of the computing portion;

g) measuring, at an actual measurement portion of the evaluation system in communication with the processing portion of the computing portion, the actual operation characteristics of the actual automated mechanism constructed by the subject in step e) and communicating the measured operation characteristics to the processing portion of the computing portion;

h) comparing, at the processing portion, the measured operation characteristics against the stored target operation characteristics to determine an operation deviation between the measured operation characteristics and the target operating characteristics; and i) assigning an evaluation point score based on the design deviation determined in step d), the operation deviation determined in step h, the evaluation time fixed in step t) and the number of times the mechanism constructed by the subject has been modified relative to achieving the target design and operation characteristics of the evaluation task mechanism; and wherein at the assembling apparatus where the subject constructs, programs automation if a programmable controller is selected, tests the actual automated mechanism, and performs post-modifications, programming, and testing, of the actual automated mechanism designed by the subject, the evaluation subject performing without assistance of another and without availability of step by step instructions designed by another, whereby the technical ability being demonstrated by the design, construction, programming, testing, and modifications, and that which is to be evaluated, is that only of the subject.

3. A computer-implemented method of evaluating an ability of an individual to design and construct an object using a computer having a processor, display, memory, an input device, and a measurement portion, and an assembly station, comprising:

displaying a set of design criteria for said object on the display;

receiving inputs via the input device from the individual pertaining to design of said object;

at the assembly station where the individual constructs, programs automation if a programmable controller is selected, tests the object as constructed and programmed, and performs post-modifications, programming, and testing of the object designed by the individual, the individual performing without assistance of another and without availability of step by step instructions designed by another, whereby the technical ability being demonstrated by the design, construction, programming, testing, and modifications, and that which is to be evaluated, is that only of the individual;

measuring a construction and performance of said object with the measurement portion;

processing with the processor the design inputs and construction and performance measurements relative to a target design and construction stored in memory for said object according to predetermined parameters of said target design and construction, wherein said processing comprises:

assigning respective point values to both the performed design and operability thereof and to the target design and operability thereof; and adjusting a point value associated with the performed design and operability thereof to provide a point score indicating a quality of the performed design and operability thereof relative to the target design and operability thereof, in which said adjustment comprises deduction of a point value from said point value associated with said target design and operability thereof, said deducted point value comprising a point value respectively associated with selection of components used to construct said object by said individual, operability of said object constructed with said components, time of completion of said performed design, and an amount of modification of said performed design relative to said target design and operability, said amount of modification being defined by the number of times said performed design has been modified by the evaluation subject in order to achieve said target design and operability.

4. The computer-implemented method according to claim 3, wherein:

the performed design is constructed from a selection of components selected using the input device from the group consisting of corresponding and non-corresponding components relative to the said set design criteria.

5. The computer-implemented method according to any one of claims 3 to 4, wherein:

said components used in constructing said performed design are graphically or textually displayed on said computer.

* * * * *